United States Patent [19]

Denk

[11] Patent Number: 4,617,726
[45] Date of Patent: Oct. 21, 1986

[54] MAXIMUM STIFFNESS PERMANENT MAGNET ROTOR AND CONSTRUCTION METHOD

[75] Inventor: Joseph Denk, Manhattan Beach, Calif.

[73] Assignee: The Garrett Corporation, Los Angeles, Calif.

[21] Appl. No.: 678,740

[22] Filed: Dec. 6, 1984

[51] Int. Cl.[4] .......................................... H02K 15/02
[52] U.S. Cl. .................................... 29/598; 310/156; 310/42; 310/262; 228/186; 228/131; 228/175; 228/161
[58] Field of Search .................... 29/596, 598; 310/42, 310/156, 153, 262; 228/131, 161, 175, 186

[56] References Cited

U.S. PATENT DOCUMENTS

| | | |
|---|---|---|
| 1,535,330 | 4/1985 | Mills . |
| 2,213,724 | 9/1940 | Vogel ................................. 310/156 |
| 2,432,436 | 12/1947 | Morrill . |
| 2,475,776 | 7/1949 | Brainard . |
| 2,493,102 | 1/1950 | Brainard . |
| 2,504,823 | 4/1950 | George . |
| 2,571,318 | 10/1951 | Warner . |
| 2,963,599 | 12/1960 | Gaylor . |
| 3,077,026 | 2/1963 | Blackburn . |
| 3,132,270 | 5/1964 | Phelon . |
| 3,292,126 | 12/1966 | Palm . |
| 3,368,275 | 2/1968 | Eberline et al. . |
| 3,531,670 | 9/1970 | Loudon . |
| 3,581,394 | 6/1971 | Phelon . |
| 3,979,821 | 9/1976 | Noodleman . |
| 4,011,120 | 3/1977 | Aggen . |
| 4,454,977 | 6/1984 | Aldinger et al. ....................... 228/131 |
| 4,549,341 | 10/1985 | Kasabian ................................ 310/42 |

FOREIGN PATENT DOCUMENTS 2052319 1/1981 United Kingdom .

Primary Examiner—Mark Rosenbaum
Assistant Examiner—P. W. Echols
Attorney, Agent, or Firm—Leslie S. Miller; Albert J. Miller

[57] ABSTRACT

A permanent magnet rotor construction technique resulting in a rotor having excellent stiffness characteristics and being capable of higher speeds and longer lengths is disclosed. The rotor is constructed using non-fusion bonding techniques whereby an inner cylinder of magnetizable material is bonded inside a hollow outer cylinder of non-magnetizable material, with the resulting assembly having cylindrical end pieces also of non-magnetizable material bonded at each end. Pockets for receiving the rare earth permanent magents are then machined through the outer cylinder, and the magnets are mounted in the pockets in contact with the magnetizable material of the inner cylinder. Construction of the rotor is completed by installing a thin cylindrical shell over the permanent magnets in the areas of the rotor adjacent thereto.

27 Claims, 5 Drawing Figures

MAXIMUM STIFFNESS PERMANENT MAGNET ROTOR AND CONSTRUCTION METHOD

BACKGROUND OF THE INVENTION

Generators for use in high output, high speed applications are devices with critical weight and volume restrictions. Such devices typically have permanent magnet rotors, which have a plurality of rare earth permanent magnet elements located on a shaft of magnetized material. The shaft has a number of flat machined faces about its periphery, onto which the rare earth permanent magnet elements are mounted.

Generally, spacers made of aluminum or some other non-magnetizable material are located around the periphery of the shaft in the area between the magnets, and rings of the same type of non-magnetizable material are located on both ends of the shaft axially adjacent the annulus of permanent magnets and spacers. An outer sleeve made of non-magnetizable material is shrink-fitted over the magnets, spacers, and rings to prevent the magnets from moving radially outward during high speed rotation of the rotor.

While such construction provides acceptable characteristics for most generator applications, it also presents several major problems in state-of-the art generators operating at extremely high speed and providing very high output, resulting in reduced performance, high reject rate, and a relatively high unit cost. One significant problem is that of heat build up in the rotor. The heat transfer characteristics of rotors constructed of spacers and rings as described above are not uniform, and may thus lead to heat buildup possibly resulting in damage to the rare earth permanent magnets. In addition, it is apparent that machining the spacers and rings to fit together properly with the magnets is fairly difficult and requires extremely close tolerances. If the rings and spacers in the rotors do not fit exactly, the rotor will not be stable at very high rotational speeds, thus allowing relative movement of the components under the outer sleeve and an unbalanced condition in the rotor which may result in dynamic failure of the device.

A more serious problem encountered in the construction of such a permanent magnet rotor is that the rotor assembly does not have good rigidity or good shaft stiffness, thus reducing the flexure critical speed of the device, which is the maximum speed of rotation without significant dynamic vibration occuring. Since the rotor must be designed to operate at a very high rate of speed, the lack of proper stiffness in rotor construction will result in a high rejection rate at best, and possibly in a product which will not perform within the required specifications. It may be appreciated that manufacture of a permanent magnet rotor with a shaft, magnets, spacers and rings, and the outer sleeve is a very expensive method of construction. The very precise tolerance requirements of the spacers and rings and the high unit rejection rate both add further to the high cost of construction to such rotors.

An alternative rotor construction resulting in a substantially improved rotor capable of higher output, higher speed operation is described in U.S. patent application No. 515,331, now U.S. Pat. No. 4,549,341, entitled "Permanent Magnet Rotor and Method for Producing Same" filed July 19, 1983 by George Kasabian, which application is assigned to the assignee of the present invention, and is hereby incorporated by reference herein. This construction involves making a rotor by casting a non-magnetic material, preferably aluminum, directly onto the steel shaft with pockets or apertures for the permanent magnets cast into the aluminum, thereby reducing the need for machining. Following a small amount of machining of the assembly containing the magnets, a non-magnetic outer sleeve is then heat shrunk onto the shaft.

This construction results in a completed rotor assembly having substantially improved rigidity characteristics, with an accordingly increased flexure critical speed and reduced possibility of dynamic unbalance in the rotor leading to machine failure. Since rings and spacers are not used in this technique, the tolerance problems accompanying this use is minimized. Additionally, since a reduced amount of machining is necessary the rotor is more economical to manufacture.

While this manufacturing technique increases rotor rigidity, it is desireable to have an even more rigid rotor to allow construction of a longer rotor. Longer rotors are desirable since length of the rotor is generally proportional to output capacity of the resulting machine; however, with longer rotors of similar diameter and characteristics flexure critical speeds tend to decrease. In order to obtain both maximum output and maximum operating speed (which aids in producing maximum output), it is apparent that it is necessay to further increase rigidity of the rotor over the aluminum molding technique.

While increasing the rigidity of the rotor, it is necessary to retain the other advantages of the aluminum injected rotor. For example, machining of parts should be kept to a minimum to reduce overall cost per unit. The number of parts should also be kept to a minimum, thereby avoiding the main design problem of spacer and ring construction, improper fit, while still minimizing heat buildup by ensuring a tight fit between the rotor and the magnets. Finally, the resulting electrical machine must provide both high output and high speed operation in a minimal size package and at an economically feasible cost while having a low unit rejection rate.

SUMMARY OF THE INVENTION

The present invention provides a rotor having exceptional rigidity characteristics due to its construction from cylindrical stock combined in unitary construction by nonfusion welding processes to hold the magnets. A non-magnetic outer cylinder fitting snugly over a steel inner cylinder is welded in a nonfusion process to the inner sleeve in a hot isostatic pressing bonding procedure. The resulting joint between the inner cylinder and the outer cylinder is as strong as the materials themselves.

The ends of the resulting assembly are then machined flat, and a pair of cylindrical end pieces are bonded by friction or inertia welding onto the assembly comprising the inner and outer cylinders. The inertia welding produces a high quality bond between the end pieces and the inner and outer cylinders.

Pockets for holding the permanents magnets are then machined into the outer cylinder, with the bottom of the pocket coming into contact with the surface of the steel inner cylinder. The pockets are machined to provide a close fit with the permanent magnets when they are installed, thereby ensuring good heat transfer characteristics. The permanent magnets used are rare earth permanent magnets, and they are installed in the pockets in contact with the steel inner cylinder. The outer surface of the rotor is then machined to produce a uniformly cylindrical surface, as well as any desired configurations on the ends of the rotor. Finally, a non-magnetic outer sleeve is installed on the rotor, preferably by heat-shrinking the sleeve onto the shaft. Final balancing of the rotor may then occur.

A rotor constructed according to the teachings of the present invention presents substantial advantages over other construction techniques. Since rings and spacers are no longer used, the tolerance problems and operational instability characteristics accompanying their use are no longer present. Substantial costs are saved in the reduced amount of machining required by the rotor (and the elimination of machining spacers and rings) which must be done.

The advantages of the present invention over the aluminum injected rotor, while less apparrant, are no less impressive. By using hot isostatic pressing bonding and inertial welding techniques, the resulting assembly is extremely strong and possesses excellent rigidity characteristics, substantially increasing the flexure critical speed and reducing the possibility of dynamic imbalance of the rotor over even the aluminum injected rotor. The elimination of the aluminum injection step also substantially reduces the amount of labor and equipment required to manufacture the rotor thereby further reducing the cost of construction. By using this technique rotors having substantially higher output and operating at higher speed may be constructed, thereby allowing greater performance from a smaller package than heretofor possible.

DESCRIPTION OF THE DRAWINGS

These and other advantages of the present invention are best understood through reference to the drawings, in which.

DETAILED DESCRIPTION OF THE PREFERRED EMBODIMENT

Figure 1:
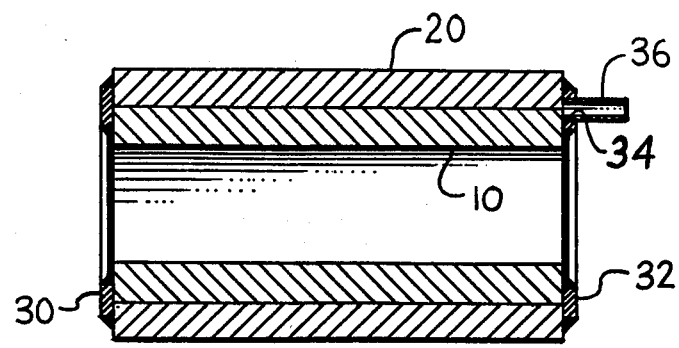
FIG. 1 is a cutaway perspective view of the inner and outer cylinders immediately before the hot isostatic pressing operation is performed to bond them together.

Like the aluminum injected rotor, the rotor of the present invention is designed to support the permanent magnets laterally with a non-magnetic material while providing an inner core made of magnetizable material upon which the permanent magnets rest. The construction of a rotor according to the present invention is shown in the figures beginning with FIG. 1.

An inner cylinder 10 which is made of magnetizable material, such as steel, is inserted into a larger outer cylinder 20, which is made of a non-magnetic material such as Inconel. The non-magnetic material used in the preferred embodiment is Inconel 718, a material which is both extremely strong and non-magnetic. The outer diameter of the inner cylinder 10 closely matches the inner diameter of the outer cylinder 20 in order to ensure a good fit. Generally speaking, clearance of 0.001-0.0015 inches has been found to be acceptable. It is important before placing the inner cylinder 10 into the outer cylinder 20 to ensure that the adjoining surfaces of the inner cylinder 10 and the outer cylinder 20 are completely free from films, oxides, and other contaminants. A first end plate 30 is placed at one end of the assembly consisting of the inner cylinder 10 and the outer cylinder 20 so that the end plate 30, which resembles a flat washer, covers completely one end of the joint between the inner cylinder 10 and the outer cylinder 20. The end plate 30 is then welded onto the inner cylinder 10 and the outer cylinder 20 to provide a seal at that end of the inner cylinder 10 and the outer cylinder 20.

A second end plate 32 is used which is identical to the first end plate 30, with the exception that an aperture 34 has been made in the surface of the end plate 32 to allow a pinch tube 36 to be installed. The pinch tube 36 is securely fastened to the end plate 32 by brazing or other means.

The second end plate 32 is then placed on the other end of the assembly comprising the inner cylinder 10 and the outer cylinder 20, as shown in FIG. 1, in a fashion so as to cover the remaining joint area between the inner cylinder 10 and outer cylinder 20. The interior of the pinch tube 36 is located in the end plate 32 so as to communicate with the joint between the inner cylinder 10 and the outer cylinder 20. The second end plate 32 is then welded into place on the inner cylinder 10 and the outer cylinder 20, sealing the joint between the inner cylinder 10 and the outer cylinder 20 on this end.

It will be appreciated that the joint between the inner cylinder 10 and the outer cylinder 20 is now completely sealed except for access through the pinch tube 36. The pinch tube 36 is used for purposes of joint evacuation, and a vacuum is applied to the pinch tube 36 to completely remove atmospheric contaminants from the joint between the inner cylinder 10 and the outer cylinder 20, and the pinch tube 36 is pinched off to preserve the vacuum. The inner cylinder and the outer cylinder 20 are thus ready to be welded in a non-fusion process. The preferred method for welding the inner cylinder 10 to the outer cylinder 20 is hot isostatic pressing (HIP) bonding, during which operation high pressure is directed radially inward on the outer cylinder 20 and radially outward on the inner cylinder 10 while the inner cylinder 10 and the outer cylinder 20 are both heated to a high temperature. HIP bonding, a type of diffusion welding, is typically performed in an autoclave filled with high pressure argon gas. For example, application of 15,000 psi pressure and 1800° F. has been used to perform the diffusion welding operation on the inner cylinder 10 and the outer cylinder 20 with HIP bonding.

Following the welding operation, the ends of the assembly comprising the inner cylinder 10 and the outer cylinder 20 are machined flat, removing the end plates 30, 32 as well as the weld joint used to fasten the end plates 30, 32 to the inner cylinder 10 and the outer cylinder 20. Considerable care must be taken in the machining operation to ensure the fabrication of flat surfaces on the ends of the assembly comprising the inner cylinder 10 and the outer cylinder 20.

Figure 2:
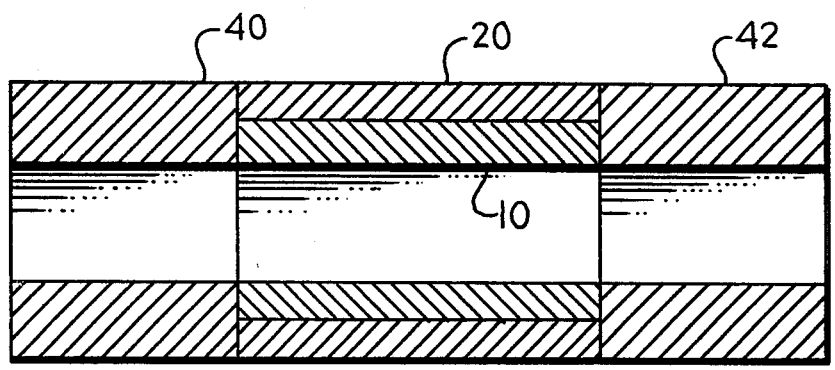
FIG. 2 is a cutaway view showing the end pieces frictionally welded onto the machined ends of the inner and outer cylinders.

Moving now to FIG. 2, two cylindrical end pieces 40, 42 also made of non-magnetic material, preferably also Inconel 718, are provided which are preferably of the same outer diameter as the outer cylinder 20 and the same inner diameter as the inner cylinder 10. The ends of the end pieces 40, 42 to be joined to the inner cylinder 10 and the outer cylinder 20 must also be machined flat to ensure the creation of good joints.

The welding operation to join the end pieces 40, 42 to the assembly comprising the inner cylinder 10 and the outer cylinder 20 is another non-fusion welding process known as friction welding or inertia welding. In inertia welding the heat required for the welding operation is the result of frictional heating caused by rotating the joint components against each other using predetermined amounts of kinetic energy and pressure, making friction welding a highly repeatable operation. The end piece 40 is friction welded to one end of the assembly comprising the inner cylinder 10 and the outer cylinder 20, and the end piece 42 is inertia welded to the other end of the assembly.

Figure 3:
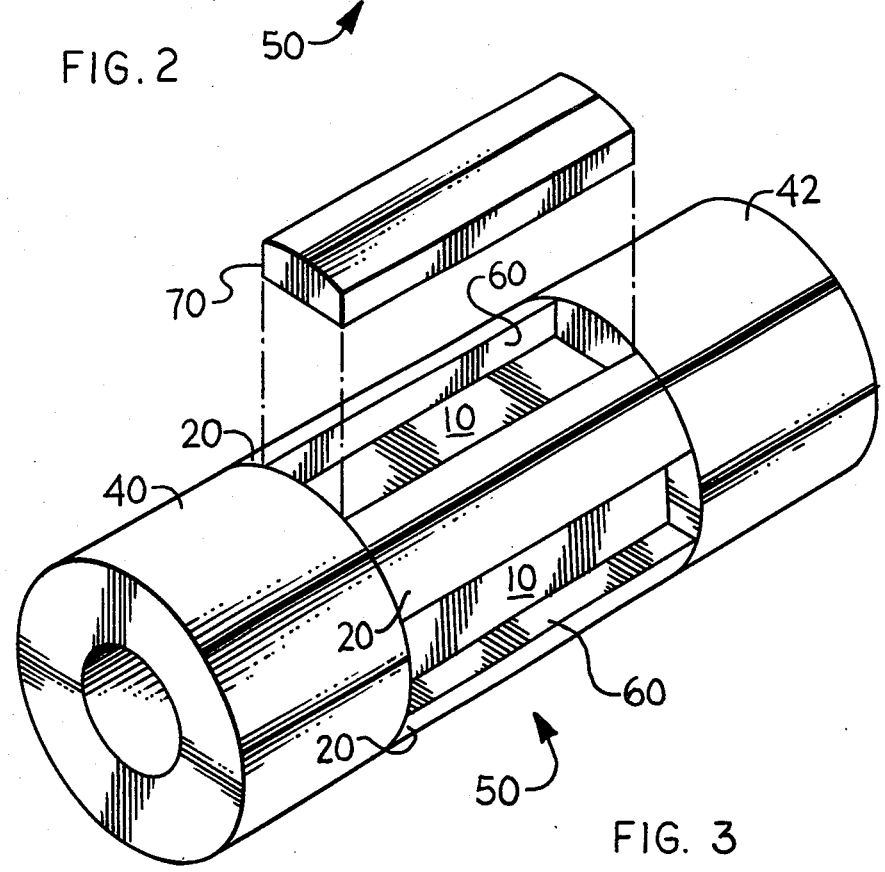
FIG. 3 is a perspective view of the rotor of FIG. 2 with pockets for receiving the permanent magnets machined into and through the outer cylinder and in contact with the inner cylinder.

The next step of construction, which is illustrated in FIG. 3, is the machining of pockets 60 into the rotor assembly 50, typically by milling. The pockets 60 are machined through the entire thickness of the outer cylinder 20, so that the innermost portion of the pocket 60 is in full contact with the inner cylinder 10, which is made of magnetizable material. The pockets 60 are machined through the entire length of the outer cylinder 20, so that permanent magnets 70, when installed in the pockets 60, will be in contact with the magnetizable material of the inner cylinder 10 throughout the length of the inner cylinder 10.

Depending on the type of machine being constructed, the number of poles, and hence magnets 70, to be placed on the rotor assembly 50 will vary. In the embodiments shown in FIG. 3, a four pole machine is illustrated. The magnets 70, which are typically rare earth permanent magnets such as samarium cobalt or neodymium-iron, may be installed in the pockets 60 without adhesives if desired, although in the preferred embodiment a high temperature liquid adhesive such as Loctite is used. It is apparent at this point that by careful machining of the pockets 60 the magnets 70 will fit tightly therein, thereby insuring excellent heat transfer characteristics.

Figure 4:
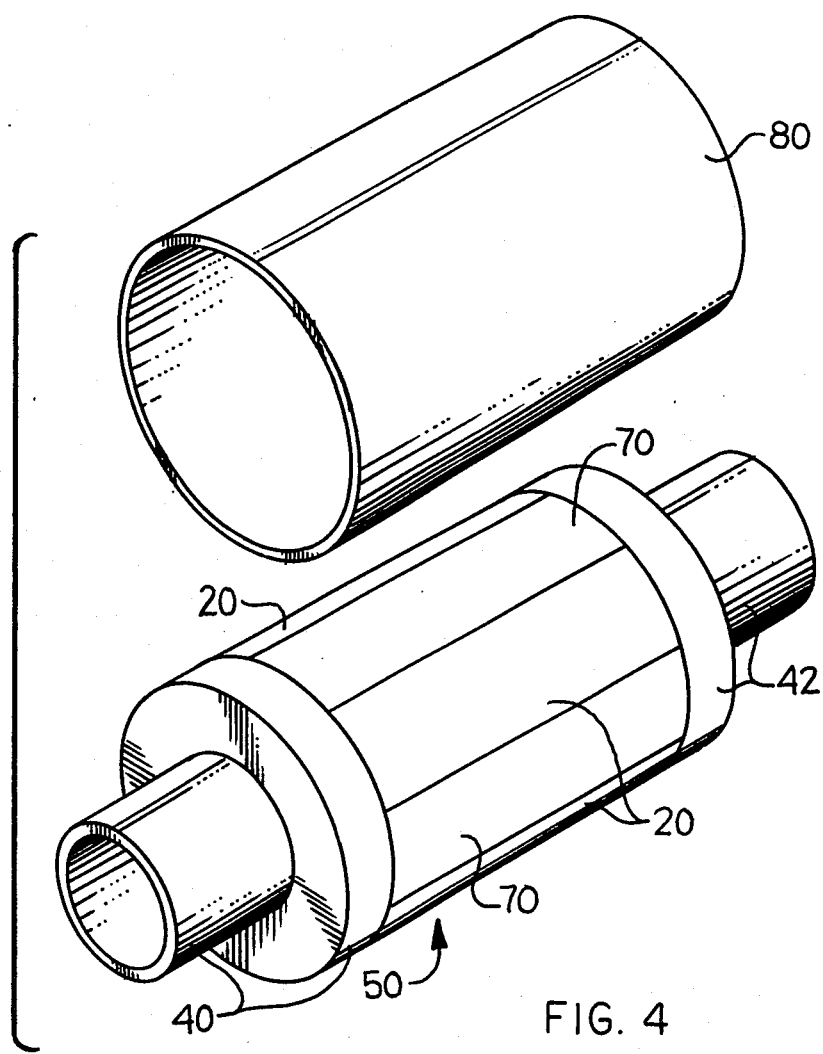
FIG. 4 shows an exploded perspective view of the installation of the outer cylinder onto the rotor assembly of FIG. 3 following installation of the magnets and final machining.

Following the installation of the magnets 70 onto the rotor assembly 50, a final machining operation takes place in which the surface of the rotor assembly 50 is machined to the desired final dimensions, resulting in an appearance similar to the rotor assembly 50 as shown in FIG. 4. At this point it should be noted that the permanent magnets 70, when installed in the pockets 60, (FIG. 3) are generally sized so that they will extend slightly from the surface of the rotor assembly 50. In the machining operation mentioned above, the surface of the permanent magnets 70 as well as the surfaces of the outer cylinder 20 and the end pieces 40, 42 are machined. By machining the surface of the permanent magnets 70, it is ensured that the entire rotor surface will be as smooth as possible prior to installation of an outer sleeve, which is described below.

The final assembly step, shown in FIG. 4, is to install an outer shell 80 onto the rotor assembly 50. The outer shell is also made of non-magnetic material, preferably Inconel 718. The outer shell 80 thickness is kept to a minimum to keep the distance between the magnets 70 and the stator (not shown) of the device as small as possible. Typically, the shell 80 thickness may vary from 0.04 inches to 0.28 inches. Factors in determining the required shell thickness include the diameter of the rotor assembly 50, the speed at which the device will operate, and the related centrifugal force operating on the rotor assembly 50.

The fit of the shell 80 on the rotor assembly 50 is a high-interference fit. The preferred method for installation of the shell 80 is to put the rotor assembly in dry ice, to heat the shell 80, and to immediately install the shell 80 onto the rotor assembly 50. The shell 80 is then immediately cooled by directing water onto the shell 80 and the rotor assembly 50, to prevent any possible heat damage to the magnets 70. The rotor assembly 50 and the shell 80 may then be balanced by drilling holes 100 in the site of the larger diameter portion of the rotor as shown in FIG. 4. In certain applications, it may also be desireable to weld the outer shell 80 onto the rotor assembly 50 prior to the balancing operation, although it has been found that the high-interference fit of the shell 80 on the rotor assembly 50 without welding is generally acceptable.

Figure 5:
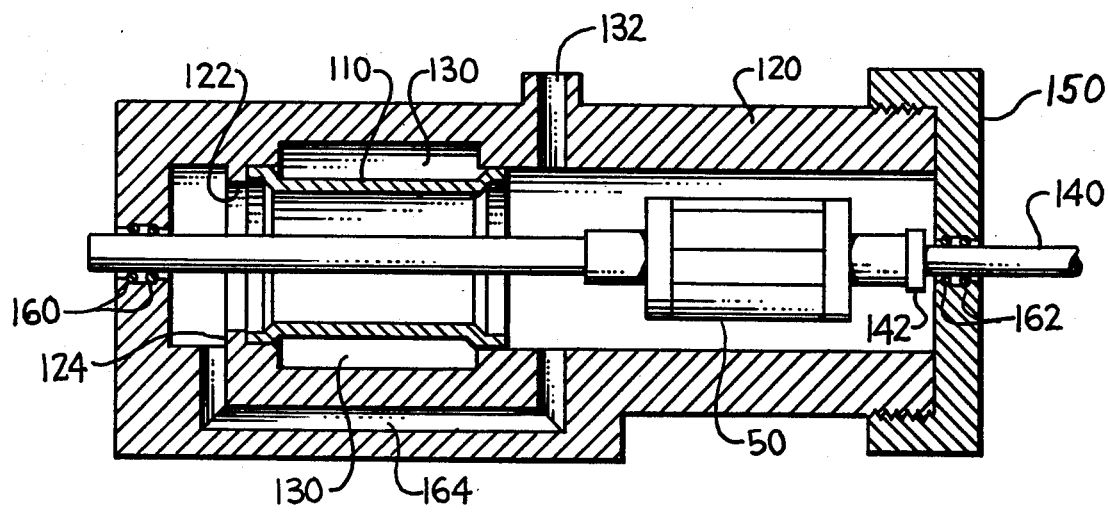
FIG. 5 is a cutaway view of a device used to install the outer shell by using pressure in accordance with an alternate embodiment of the present invention.

An alternative embodiment uses pressure to slightly expand an outer shell 110 to allow the rotor assembly 50 to be inserted into the outer shell 110, as illustrated in FIG. 5. A housing 120 open at one end is designed to receive the shell 110, which has a diameter at the ends thereof which is slightly larger than the diameter of the portion imtermediate the ends. The shell 110 is positioned in the housing 120 with its inward movement limited by tabs 122, 124 made integrally with the housing 120. The portions of the housing 120 around the outside of the intermediate portion of the shell 110 contain an annular recessed area 130 in which hydraulic pressure will not be present, and which may be vented. It is thus apparent that when the interior of the housing 120 is supplied with pressurized hydraulic fluid through an inlet 132, the shell 110 will be caused to expand outwardly, slightly increasing its inner diameter.

The rotor assembly 50 is placed on a hydraulic ram 140 extending through the housing 120 and having an integral plate 142 to force the rotor assembly 50 into the shell 110. The housing 120 is sealed at its open end by a cover 150 which may be screwed onto the housing 120, and through which the hydraulic ram 140 extends. The hydraulic ram 140 is sealed by packing 160, 162 in the housing 120 and the cover 150.

Hydraulic pressure is supplied to the housing 120, causing the shell 110 to expand radially outwardly. The hydraulic ram 140 then forces the rotor assembly 50 into the shell 110, with proper placement being limited by contact of the rotor assembly 50 with the closed end of the housing 120. During this operation, supply of hydraulic pressure to the interior of the shell 110 is ensured by providing a hydraulic passage 164 in the housing 120 to equalize pressure on both sides of the shell 110.

By using this embodiment, it is not necessary to heat the shell 110. Accordingly, the chance of damaging the magnets 70 by heating them when the shell 110 is installed on the rotor 50 is completely eliminated.

A rotor constructed according to the principles of the present invention possesses superior rigidity characteristics, and therefore substantially increases the critical speed the machine is capable of while reducing the possibility of dynamic unbalance in the rotor which could lead to machine failure. Since the rigidity characteristics are substantially improved over even the aluminum injection molded rotor discussed above, a longer rotor than heretofore possible may be constructed, which will of course result in a higher rated machine operating at the same speeds.

Depending on the design of the particular machine, which as those skilled in the art will immediately recognize may vary considerably depending on application requirements, a machine using a rotor constructed according to the present invention may provide as much as 100% more output for a given design, and typically at least 50% more output than a machine containing an aluminum injected rotor, which itself was and is far more efficient than rotors constructed using rings and spacers. Even though the rotor of the present invention provides such greatly improved operating characteristics, it will be apparent to those skilled in the art that it may be constructed fairly economically due to the greatly reduced machining as compared to the ring and spacer type motor, and the elimination of the aluminum injection molding step in the aluminum injected rotor. Since the present invention also provides a rotor producing a higher output from a given volume and weight while retaining excellent strength and reliability characteristics, the present invention represents a significant step forward in improving the state of the art.

I claim:

1. A method of manufacturing a rotor, comprising:
   first bonding the inner surface of a hollow outer cylinder of non-magnetizable material to the outer surface of an inner cylinder of magnetizable material to make an assembly;
   second bonding a first end piece of non-magnetizable material to one end of said assembly;
   third bonding a second end piece of non-magnetizable material to the other end of said assembly;
   machining a plurality of pockets for receiving magnets into and through the thickness of said outer cylinder, thereby exposing in each of said pockets a surface contained in said inner cylinder;
   mounting a plurality of permanent magnets into said plurality of pockets, and in contact with said inner cylinder;
   installing a cylindrical sleeve of non-magnetizable material over said permanent magnets and the portions of said outer cylinder therebetween.

2. A method as defined in claim 1, wherein the outer radius of said inner cylinder is 0.001–0.0015 inches less than the inner radius of said outer cylinder.

3. A method as defined in claim 1, wherein said outer cylinder is bonded to said inner cylinder in a hot isostatic pressing bonding procedure.

4. A method as defined in claim 1, wherein said bonding step comprises:
   inserting said inner cylinder into said outer cylinder;
   sealing and evacuating the joint between said inner cylinder and said outer cylinder;
   applying high pressure and heat to bond said inner cylinder to said outer cylinder in a non-fusion process.

5. A method as defined in claim 4, wherein said sealing and evacuating step comprises:
   welding a flat washer-shaped end plate onto one end of said inner and outer cylinders to seal the one end of said inner and outer cylinders;
   welding a second flat washer-shaped end plate onto the other end of said inner and outer cylinders to seal the other end of said inner and outer cylinders;
   providing a pinch tube extending through said second end plate to communicate with said joint; and
   evacuating said joint through said pinch tube and sealing off said pinch tube.

6. A method as defined in claim 5 additionally comprising:
   machining the ends of said assembly after said first bonding step to a flat configuration, thereby removing said first and second end plates, said pinch tube, and any welding material used in securing said first and second end plates to said inner and outer cylinders.

7. A method as defined in claim 4, wherein said applying step is performed in an autoclave and said high pressure is provided by high pressure gas in said autoclave.

8. A method as defined in claim 1, wherein said second and third bonding steps are performed using inertia welding.

9. A method as defined in claim 1, wherein said machining step is performed by milling said pockets into said assembly to tightly fit said permanent magnets.

10. A method as defined in claim 1, wherein said machining step includes removing a portion of said inner cylinder to have a flat surface at the bottom of said pockets.

11. A method as defined in claim 1, wherein said mounting step utilizes liquid adhesive to adhesively hold said permnanet magnets in said pockets.

12. A method as defined in claim 1, further comprising:
   machining the surface of said rotor after said permanent magnets are mounted and before said cylindrical sleeve is installed to provide a smooth surface upon which said cylindrical sleeve may be installed.

13. A method as defined in claim 1, wherein said permanent magnets are samarium cobalt or neodymium-iron.

14. A method as defined in claim 1, wherein said non-magnetizable material is Inconel 718.

15. A method as defined in claim 1, further comprising:
   balancing said rotor after said installing step.

16. A method as defined in claim 1, wherein said installing step comprises:
   cooling said assembly, permanent magnets, and first and second end pieces;
   heating said sleeve and sliding said sleeve onto said assembly over said permanent magnets.

17. A method as defined in claim 1, wheren said installing step comprises:
   applying hydraulic pressure to the interior of said cylindrical sleeve to expand said cylindrical sleeve radially outwardly; and
   sliding the rotor assembly into said cylindrical sleeve.

18. A method of manufacturing a rotor, comprising:
   providing an inner cylinder of magnetizable material;
   first bonding an outer cylinder of non-magnetizable material fitting snugly over said inner cylinder to said inner cylinder to form an assembly consisting of said inner cylinder and said outer cylinder;
   second bonding a first end piece of non-magnetizable material to one end of said assembly;
   third bonding a second end piece of non-magnetizable material to the other end of said assembly;
   machining a plurality of pockets for receiving magnets into and through said outer cylinder, said pockets being in contact with said inner cylinder;

mounting a plurality of permanent magnets into said pockets, said permanent magnets being in contact with said inner cylinder; and retaining said permanent magnets in said pockets by installing a sleeve of non-magnetizable material over said permanent magnets and the portions of said outer cylinder adjacent thereto.

19. A method of manufacturing a rotor, comprising:

first bonding an outer cylinder of non-magnetizable material to an inner cylinder of magnetizable material, the outer diameter of said inner cylinder closely fitting inside the inner diameter of said outer cylinder;

second bonding a first end piece to one end of said inner and outer cylinders;

third bonding a second end piece to the other end of said inner and outer cylinders;

machining a plurality of pockets for receiving magnets through said outer cylinder to expose the surface of said inner cylinder in the bottom of said pockets;

mounting a plurality of rare earth permanent magnets into said pockets; and installing an outer sleeve of non-magnetizable material over said permanent magnets and the portions of said outer cylinder adjacent thereto.

20. A permanent magnet rotor, comprising:

an inner cylinder of magnetizable material;

a hollow outer cylinder of non-magnetizable material surrounding and bonded to said inner cylinder, thereby forming an assembly;

a plurality of permanent magnets mounted in pockets machined into and through said outer cylinder, said magnets being in contact with said inner cylinder;

a first end piece of non-magnetizable material bonded to one end of said assembly;

a second end piece of non-magnetizable material bonded to the other end of said assembly; and a sleeve of non-magnetizable material installed over said magnets and the portions of said outer cylinder therebetween.

21. The apparatus as defined in claim 20, wherein the outer radius of said inner cylinder is 0.001–0.0015 inches less than the inner radius of said outer cylinder.

22. The apparatus as defined in claim 20 wherein the bond between said outer cylinder and said inner cylinder is a hot isostatic press bond.

23. The apparatus as defined in claim 20, wherein the bond between said outer cylinder and said inner cylinder is a non-fusion bond.

24. The apparatus as defined in claim 20, wherein the bond between said first end piece and one end of the assembly and the bond between said second end piece and the other end of the assembly are inertial welded bonds.

25. The apparatus as defined in claim 20, wherein said permanent magnets are samarium-cobalt.

26. The apparatus as defined in claim 20, wherein said permanent magnets are neodymium-iron.

27. The apparatus as defined in claim 20, wherein said non-magnetizable material is Inconel 718.

* * * * *